Jan. 30, 1962   J. W. KALB   3,019,367
LIGHTNING ARRESTER AND GAP UNIT THEREFOR
Filed Jan. 4, 1957   4 Sheets-Sheet 1

INVENTOR.
JOHN W. KALB
BY
ATTORNEY

Jan. 30, 1962  J. W. KALB  3,019,367
LIGHTNING ARRESTER AND GAP UNIT THEREFOR
Filed Jan. 4, 1957  4 Sheets-Sheet 2

INVENTOR.
JOHN W. KALB
BY
Kenneth W. Miller
ATTORNEY

Jan. 30, 1962   J. W. KALB   3,019,367
LIGHTNING ARRESTER AND GAP UNIT THEREFOR
Filed Jan. 4, 1957   4 Sheets—Sheet 4

INVENTOR.
JOHN W. KALB
BY
ATTORNEY

United States Patent Office 3,019,367
Patented Jan. 30, 1962

3,019,367
LIGHTNING ARRESTER AND GAP UNIT THEREFOR
John W. Kalb, Wadsworth, Ohio, assignor to The Ohio Brass Company, Mansfield, Ohio, a corporation of New Jersey
Filed Jan. 4, 1957, Ser. No. 632,551
34 Claims. (Cl. 315—36)

This invention relates to methods of and means for over-voltage circuit protection, and more particularly to new and improved lightning arresters and gap units therefor.

In my United States Patent No. 2,825,008, dated February 25, 1958, I have disclosed and described a new method of and means for over-voltage circuit protection for conductor systems which are subject particularly to the influence of lightning fields and discharges. According to the invention therein described, there is provided an over-voltage protection apparatus or lightning arrester in which the flow of system energy to ground or power follow current, consequent upon the establishment of a conductive path to ground through an arc gap induced by a lightning discharge, is limited by increasing the length of the arc. The lengthening of the arc is accomplished in relation to the magnitude of the current in the conductive path.

According to the operative embodiments of the invention therein disclosed and described, a gap unit is provided in which the arc is moved outwardly from the initial arc path, along the gap electrodes, and into an arc chamber, under the influence of a magnetic field. The arc chamber is provided with an arrangement of interleaving ribs which are disposed transversely of the arc path and which are of increasing height relative to each other so that the arc is maintained along a path of ever increasing length as it is moved. The magnetic field is generated by a coil which is connected in series with the gap unit and the valve block of the arrester. A nonlinear conductive means, e.g. an auxiliary arc gap or nonlinear resistor is provided in shunt with the magnetic coil.

In operation, an impulsive voltage of greater than the breakdown voltage of the gaps of the arrester, such as might be due to a lightning discharge, causes the arc gaps of the gap unit to break down and conduct the impulsive discharge through the valve blocks to ground, thus dissipating the energy of the discharge. During this interval, the impulse current is conducted through the shunt conductive means inasmuch as the voltage and current changes are so rapid that there can be no substantial flow of current in the coil. During the succeeding interval, after the impulsive discharge is terminated, the arcs in the gap unit are maintained by the flow of current produced by the system energizing voltage through the gaps of the gap unit. However, the rate of change of the system energizing voltage and, therefore, the power follow current is relatively slow so that current flows through the magnetic coil generating a magnetic field which moves the arcs of the gap unit into the arc chambers, thus increasing the lengths of the several arcs and the arc voltage. With the increase in arc voltage, the system energizing voltage across the valve blocks is proportionately reduced, thus reducing not only the magnitude but also the duration of power current flow.

The importance of the invention resides in that the large arc voltages produced by the elongation of the arc reduces the energy dissipation requirements imposed upon the valve blocks with the consequent permissible reduction in the size and cost of the arrester.

The present invention is in furtherance of the general principles of the invention set forth in the above referenced pending application, but contemplates a modification of the nature and design of the gap unit in order to produce a controlled increase in arc length after the arc is initially established. Particularly, the present invention contemplates the utilization of a number of relatively small arc gaps which are adapted to break down or arc-over at a predetermined voltage but in which all the arcs so formed are moved along lengthening arc paths under the influence of a common magnetic field generated by one or more magnetic coils. This is possible because of my discovery that the utilization of divergent electrodes fixed at an angle of less than 180° will support an arc whose energy may be dissipated at a rate such that large arc voltages are generated. This electrode arrangement is employed with a novel arrangement for permitting the internal atmosphere of the arc chamber of each gap to circulate during arc movement, so that the arc may be moved in a closed chamber without restriking. This permits a significant reduction in the size of the gap unit for a given arc interrupting capability.

In accordance with the invention, the gap unit is constructed of a multiplicity of identical plates of insulating material which embody a particular configuration for forming arc chambers when placed in operative relation and in which arcing electrodes are positioned on opposite sides of each plate. The plates and electrodes are so disposed and arranged that adjacent chambers have the arc gaps disposed at an angle of 120° with respect each to the other so that every fourth gap has a transverse axis parallel to the corresponding prior gap. The gap electrodes form a generally helical arcing path about the longitudinal axis of the gap unit.

The gap unit has particular advantages in that by the use of a number of small arcs disposed along a generally helical arcing path and subjected to a common magnetic field, large arc voltages may be generated and the rate of arc lengthening controlled and related to the current flow in the arrester. Moreover, the mechanical arrangement of the gap plates is such that the pressures created by each arc oppose each other and a much more compact gap unit may be achieved than would otherwise be the case. Further, by the use of a design construction in which a multiplicity of identical plates are utilized, the manufacture of the gap unit is greatly simplified and expedited.

Accordingly, it is a principal object of the invention to provide a new and improved arc unit for lightning arresters in which very substantial arc voltages may be generated, that is, substantially larger arc voltages than have herebefore been possible in the art.

It is a further general object of the invention to substantially reduce the valve block requirements in lightning arresters of a given size and capacity and to provide the necessary voltage drop in the arc unit of the arrester.

It is a further general object of the invention to facilitate arc movement in enclosed spark gaps.

It is a further object of the invention to provide a gap unit in which a plurality of series arcs are simultaneously lengthened by a magnetic field and at an exactly controlled rate.

It is a further object of the invention to reduce the physical size of gap units in high voltage lightning arresters.

A still further object of the invention is to expedite the manufacture and assembly of gap units for lightning arresters and to provide for the control of electrical and mechanical parameters in the manufacturing process thereof.

The invention, together with further objects, features and advantages thereof will be more clearly understood from consideration of the following detailed specification and claims taken in connection with the appended drawings, in which

Figure 1:
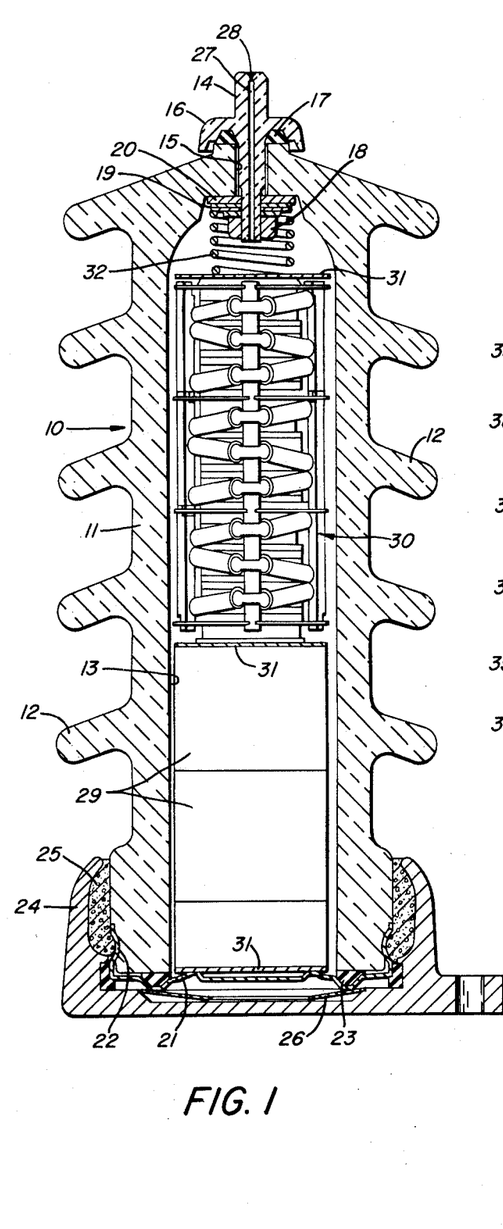
FIG. 1 is an elevation view, partly in section, of a lightning arrester constructed in accordance with the invention.

Referring now to FIG. 1, the lightning arrester 10 embodying the invention comprises an elongated housing 11 of ceramic material provided on the outside with a plurality of skirts 12 for increasing the leakage distance along the outside of the housing, and, on the interior, with an opening 13 for receiving the operative elements of the arrester.

At the upper end of the arrester, a terminal member 14 is received in an opening 15 through the housing 11 and has an outwardly protruding flange part 16 with a gasket 17 for sealing the joint between the flange 16 and the housing 11. The terminal part 14 is secured in place by means of a nut 18 which is threaded on the inner end of the terminal member and bears against a Belleville washer 19 and a key washer 20, the latter being bonded to the interior of the housing.

The lower part of the housing is closed by means of a sheet metal member 21 which has the periphery thereof rolled into a groove 22 in the housing, while a gasket 23 serves as a sealing means. A terminal member 24 is held in place by a cement filler 25 while electrical contact between the member 21 and the terminal 24 is provided by means of a spring plate 26. The interior of the arrester is evacuated through an opening 27 in the terminal member 14. The interior of the housing is then filled with an inert gas and the opening 27 is closed with a solder seal 28.

The operative elements of the arrester include a number of non-linear resistors or so-called valve blocks 29 and a gap assembly 30 which includes a plurality of gap plates, magnetic coil units and grading resistors as hereinafter described. The valve blocks and gap assembly are electrically connected to the adjacent elements and the terminal parts 14 and 21 by means of metallic plates 31 and are maintained in compressive relation by a spring 32.

Figure 2:
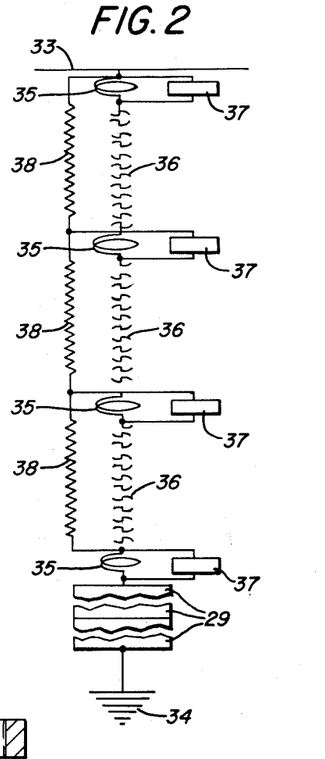
FIG. 2 is a schematic diagram of the lightning arrester of FIG. 1.

As is shown in FIG. 2, the arrester 10 is connected between a high voltage transmission line 33 and a ground 34. As thus connected, the lightning arrester has the valve blocks 29 in series with the magnetic control coils 35 and a number of arc gaps 36 from the line 33 to the ground 34. The coils 35 have certain non-linear resistors 37 connected in shunt therewith, while other non-linear resistors 38 are connected in shunt with the coils 35 and the arc gaps 36 to constitute a grading arrangement as is hereinafter explained.

Figures 3, 4, 5, 6:
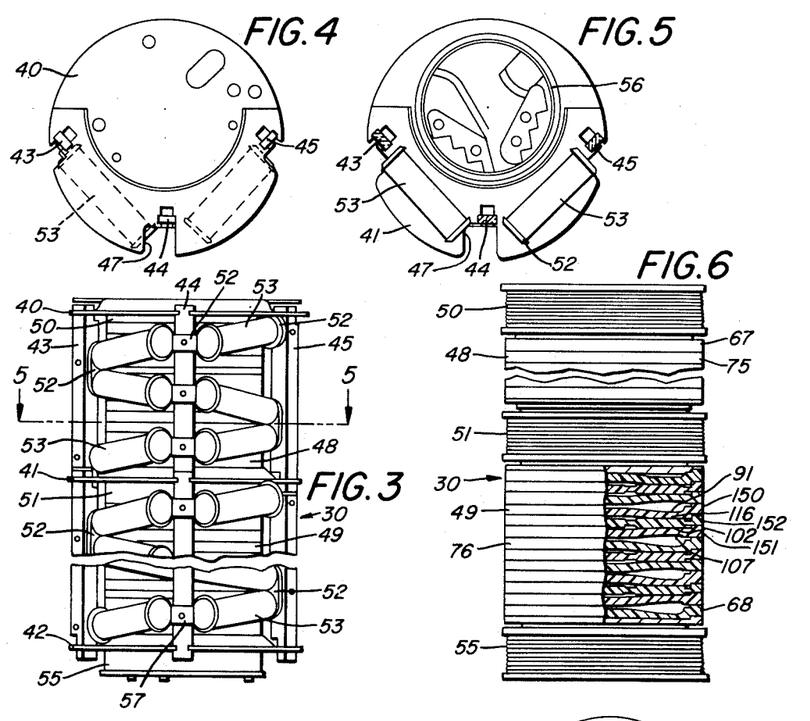
FIG. 3 is an elevation view of the gap assembly of the lightning arrester of FIG. 1.
FIG. 4 is a top plan view of the gap assembly of FIG. 3.
FIG. 5 is a section view of the gap assembly of FIG. 3 taken in the direction 5—5 in FIG. 3.
FIG. 6 is an elevation view, slightly enlarged, of the gap units and magnetic coils of the gap assembly of FIG. 3 with a portion of one gap unit shown in section.

Referring now to FIGS. 3, 4 and 5, the gap assembly 30 of FIG. 1 is there shown in more detail. The gap assembly 30 comprises a plurality of disc-like support plates 40, 41 and 42 held in vertically spaced relationship by a number of ceramic bars 43, 44 and 45 which are slotted in the sides and received in openings at the peripheries of the plates, e.g., the opening 47 for the bar 44 in the plate 40. Two gap units 48 and 49 each comprising a plurality of gap plates with the associated magnetic control units 50 and 51 are disposed within the bars 43, 44 and 45 and between the plates 40 and 41 and the gap units 48 and 49 respectively.

The bars 43, 44 and 45 also support a plurality of metallic terminals 52, each of which is riveted to its associated bar. The terminals 52 of adjacent bars receive the ends of the resistors 53 which are thus mechanically supported and electrically connected in series between the plates 40 and 41 and 41 and 42 to constitute the grading resistors 38 shown in FIG. 2. The gap units and control units are in electrical contact with and inter-connected by plates 40, 41 and 42 and to the grading resistors 53 according to the circuit arrangement shown in FIG. 2.

Each of the plates 40, 41 and 42 is formed with the one side thereof projecting outwardly from the body of the disc and is arranged to contact the associated gap plates, while the open side thereof receives the associated magnetic control unit, as is shown more clearly for the plate 42 and the control unit 55. The disposition of the plates of the gap units and the grading resistors 53 with respect to the spacer plates 40, 41 and 42 and the spacer bars 43, 44 and 45 is shown in FIG. 5, wherein the view of the gap plate 56 is intended to be schematic only, the construction of the gap plates being shown in more detail hereinafter.

There is shown in FIG. 6, an elevation view of the magnetic control units and gap units incorporated in the gap assembly 30 of FIG. 3, but without the support plates, spacer bars and grading resistors shown in that figure. It is to be noted that while plural magnetic control units are utilized in the arrangement of FIG. 6, the coils of these control units are connected in series and act together to produce a common field for simultaneous control of the movement of all of the arcs of the gap unit.

Figure 7:
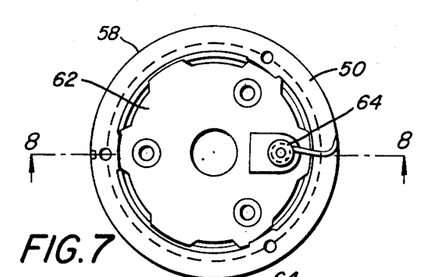
FIG. 7 is a plan view of the magnetic control unit of the invention.
Figure 8:
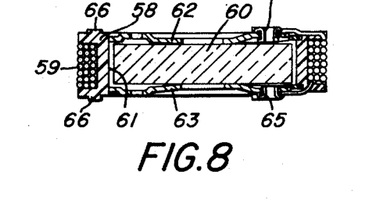
FIG. 8 is a section view of the magnetic control unit taken in the direction 8—8 in FIG. 7.

Referring now to FIGS. 7 and 8, the magnetic control unit, e.g. the control unit 50, is there shown in more detail and includes a magnetic coil for producing a magnetic field to move the arcs of the several gaps in the gap unit and a shunt non-linear resistance for controlling the current in the coil and preventing an excess voltage across the coil. The magnetic control unit 50 includes an annular form 58 of rigid insulating material upon which is wound a coil 59. A resistor 60 in the form of a cylindrical block of non-linear resistance material, such as, for example, silicon carbide in a ceramic body, is received in the central opening 61 of the form 58 and is held in position by two spring metal members 62 and 63. The spring members 62 and 63 are connected to the ends of the coil 59 by two eyelets 64 and 65 and are sufficiently resilient so that good electrical contact is maintained at the central part of the resistor 60.

The coil form 58 has peripherally disposed longitudinally extending projections 66 at each side of the form for receiving and holding the plates of the gap unit to maintain the proper relative orientation of the control unit with respect to the gap plates. Electrical connection to the magnetic control unit is made by means of the end plates of the gap unit which engage the members 62 and 63.

As set forth in the patent referred to above, other non-linear conductive means may be utilized to perform the function of the non-linear resistor 60, such as, for example, a shunt gap. I prefer, however, to use the shunt non-linear resistor as illustrated and described herein.

Figure 9:
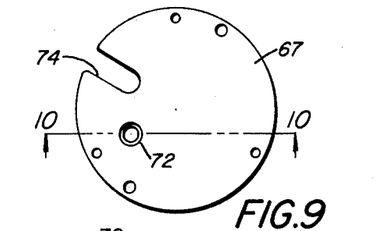
FIG. 9 is a top plan view of an end plate of the gap unit.
Figure 10:
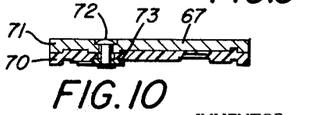
FIG. 10 is a section view of the end plate of FIG. 9 taken in the direction 10—10 in FIG. 9.

Referring now to FIGS. 9 and 10 inclusive, there is shown an end gap plate such as would be used for the terminal plate of a gap unit. Such an end plate would, for example, constitute the plate 67 of the gap unit 48 or the plate 68 of the gap unit 49 in FIG. 6 and would be disposed adjacent to and in contact with the associated magnetic control unit.

The end gap plate 67 constitutes an insulating plate member 70 which is suitably formed of a rigid insulating material. The member 70 is identical with the insulating member of certain intermediate gap plates to be described hereinafter in FIGS. 11 to 19 inclusive, and is adapted for use as an end plate by means of a metallic insert or adapter plate 71 having one side thereof conformed to and received in the recesses at the upper side of the plate 70. The entire assemblage is held together by means of a rivet 72 which passes through the plate member 70, the adapter 71 and a gap electrode 73 on the underside of the member 70. The underside of the member 70 is suitably recessed to receive the gap electrode 73 and has, in addition thereto, certain other recesses, all as is explained hereinafter in connection with the intermediate gap plates. The adapter plate 71 is provided with a radial groove 74 to accommodate the eyelets 64 and 65 of the control unit.

The adapter plate 71 serves as a contact means for making electrical connection with the adjacent member, e.g. a magnetic control unit or valve block or other contact means and to make connection between that unit or member and the first gap electrode, e.g. the electrode 73 of the gap unit. Moreover, the adapter plate 71 reinforces the member 70 to enable that member to withstand the forces generated by the several arcs of the gap unit. The member 70 is not intended to withstand, of itself, the end forces, being designed according to certain requirements of material and height saving, as is explained hereinafter.

There is shown in FIGS. 11 to 19 inclusive, several views of the intermediate gap plates which constitute with the end gap plates a complete gap unit such as, for example, the intermediate gap plates 75 of the gap unit 48 or the intermediate gap plates 76 of the gap unit 49.

Figure 11:
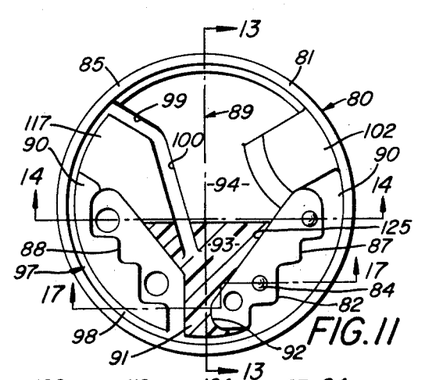
FIG. 11 is a plan view of one side of a gap plate constructed in accordance with the invention.
Figure 12:
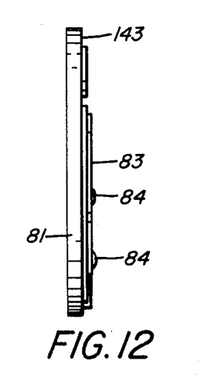
FIG. 12 is an elevation view of the gap plate of FIG. 11 taken from the right side thereof.
Figures 14, 15, 16, 17, 18, 19:
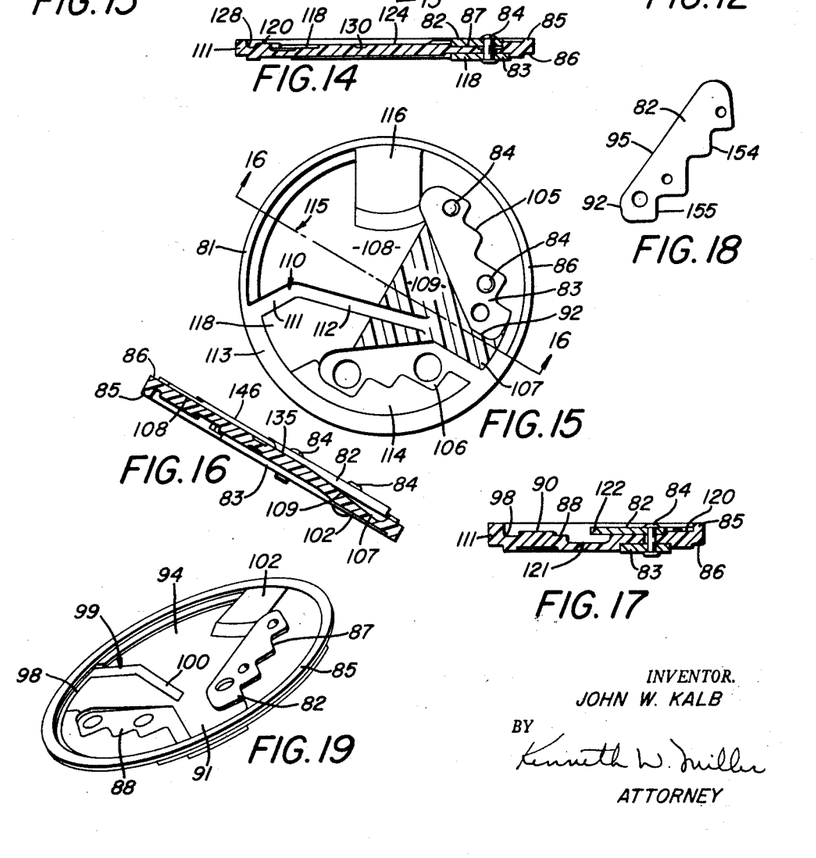
FIG. 14 is a section view of the gap plate of FIG. 11 taken in the direction 14—14 in FIG. 11.
FIG. 15 is a bottom plan view of the gap plate of FIG. 11.
FIG. 16 is a section view of the gap plate taken in the direction 16—16 in FIG. 15.
FIG. 17 is a section view taken along the line 17—17 in FIG. 11.
FIG. 18 is a plan view of a gap electrode.
FIG. 19 is a perspective view of the gap plate of FIGS. 11 and 15.

As is shown in FIGS. 11, 14 and 17, the intermediate gap plate 80 comprises a plate member 81 of rigid insulating material and having two gap electrodes 82 and 83 disposed on opposite sides of the member with two rivets 84 extending through the electrodes and the plate member to form a rigid assembly. The plate member 81 is formed with a ridge 85 peripherally about the top side of the member and a recess 86 peripherally about the underside of the member. The ridges and recesses 85 and 86 of the plate members of the adjacent gap plates engage with each other and position the plate members in the desired operative orientation with respect each to the other and to the magnetic control unit.

The top side of the plate member 81 is formed with two electrode recesses, the first recess 87 receiving the electrode 82 and the second electrode recess 88 being arranged to receive the electrode corresponding to the electrode 83 of the upper adjacent gap plate. The recesses 87 and 88 are symmetrically disposed with respect to a diametric axis, indicated as the line 89 coinciding with the section line 13—13, and are referred to as recesses with respect to the surface 90 of the plate member within the ridge 85.

Figure 13:
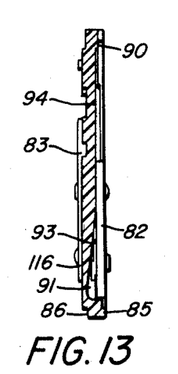
FIG. 13 is a section view of the gap plate of FIG. 11 taken in the direction 13—13 in FIG. 11.

The plate member 81 is formed with a surface 91, shown in FIG. 13, which is equally disposed between the innermost extremities of the electrode recesses 87 and 88 and near a transverse extremity of the member 81, along the diametric axis 89, but within the ridge 85. The surface 91 provides an enlarged arcing space, or arc recess about the arcing ends 92 of the electrodes. The surface 91 tapers upward along the surface 93 of the plate member and merges smoothly with the surface 94 which is disposed slightly below the principal surface 90 of the plate member. The surface 94 of the plate member constitutes, with the corresponding surface of the adjacent plate member, an arc extinguishing or suppressing chamber, while the inclined surface 93 constitutes, with the corresponding surface of the adjacent plate member, an entrance chamber to permit movement of an arc from the arc recess into the arc extinguishing chamber, as is set forth hereinafter. The entire interior portion formed by the surfaces 91, 93 and 94 of one plate and the surfaces 107, 109 and 108 of the adjacent plate is designated as the arc chamber.

In order to lengthen the arc during transverse movement of the arc in the arc chamber, the electrodes are provided with diverging inner sides, e.g. the face 95 of the gap electrode 82. The sides of the two cooperating electrodes diverge equally on opposite side of the diametric axis 89 and have an included angle in the gap shown of about 100°. The angle of divergence of the electrode is such as to prevent restriking of the arc across the ends of the electrodes, e.g. at the electrode faces 92, as the arc is moved transversely along the diverging faces of the electrodes and into the arc extinguishing chamber. The angle of divergence may vary considerably depending upon the arc voltages to be generated, angles of 150° or less being utilized to generate substantial arc voltages when used with arc chambers of the type herein described, although very small angles may be utilized where corresponding rates of arc voltage generation are required. An angle of divergence of 100° is utilized in the embodiment of the invention herein disclosed with parallel arc extinguishing chamber walls spaced a distance of about .02 inch.

The arc extinguishing chamber formed by the surface 94 of the plate member 81 is closed at its outer extremity by the peripheral ridge 85 and the engagement of that ridge with the recess of the cooperaing adjacent plate. Such an arrangement tends to limit the arc movement because of the pressure differential which exists when the arc is moved in the enclosed space of the arc chamber. I have discovered, however, that by the provision of means for permitting the circulation of the gaseous products of arcing about the arc chamber, that the arc may be moved along the divergent electrode into the arc extinguishing chamber with the desired rapidity and without restriking at the arc faces 92.

There is, accordingly, provided a groove 97 which extends about the electrode recess 88 to provide for circulation of the internal atmosphere within the enclosure formed by the adjacent plate members. The groove 97 is in three parts: a first part 98 extending peripherally along the plate member between the ridge 85 and the surface 90 from the arc recess 91 to a point approximately 150° of rotation from the arc recess; a second part 99 extending approximately radially inward for a short distance; and a third part 100 which extends diagonally from the part 99 and transversely toward the arc recess 91. The part 98 of the groove 97 is formed as a groove below the surface 90, while the parts 99 and 100 are formed as grooves below the surface 94 of the arc suppressing chamber.

A rectangular part 102 of the member 81 projects inwardly from the ridge 85 and somewhat above the surface 90. The part 102 serves as a strengthening means for the plate member and to accommodate an arc recess on the underside of the plate member as hereinafter set forth.

As is shown in FIG. 15, the underside of the plate member 81 has the same configuration as the top side of the member, being provided with electrode recesses 105 and 106 for receiving the electrode 83 and the cooperating gap electrode corresponding to the gap electrode 82 of the lower adjacent plate, respectively. Similarly, an arc recess surface 107, an arc extinguishing chamber surface 108 and an arc entrance chamber surface 109 corresponding to the surfaces 91, 94 and 93 respectively, are provided. The groove 110 is conveniently formed, however, in only two parts 111 and 112 corresponding to the grooves 99 and 100 on the top side of the member. The surface 113 adjacent the surface 114, the latter corresponding to the surface 90 of the upper side, and the cooperating ridge of the adjacent plate member form an open channel from the arc recess 107 to the groove 111 and corresponding to the part 98 of the groove 97 on the top side of the plate member.

Additionally, however, the configuration of the underside of the plate member is rotated with respect to that of the top side so that the diametric axis 115 which corresponds to the diametric axis 89 of the top side, shown in FIG. 11, is directed through an angle of 120°, proceeding counter-clockwise from the lowest portion of the diametric axis 89 in that figure with respect to the axis 89. Thus, the arc recess 107 is disposed below the part 102 on the top side of the plate and the arc recess 91 is disposed above the elevated portion 116 on the bottom of the plate. Additionally, the gap electrode 83 is oppositely directed from the electrode 82.

The surface 117 at the top side of the plate member 81 is opposed to and aligned with the surface 118 at the underside of the plate member. These surfaces receive the projecting portions corresponding to the portions 102 and 116 of the next adjacent plates, as is explained hereinafter in connection with FIG. 6.

The arrangement above described also provides a helical disposition of the electrodes and arc gaps with the associated arc chambers about the longitudinal axis of the gap unit with the electrode rivets of each plate serving as the electrical connections between the gap electrodes of successive gaps.

Figure 20:
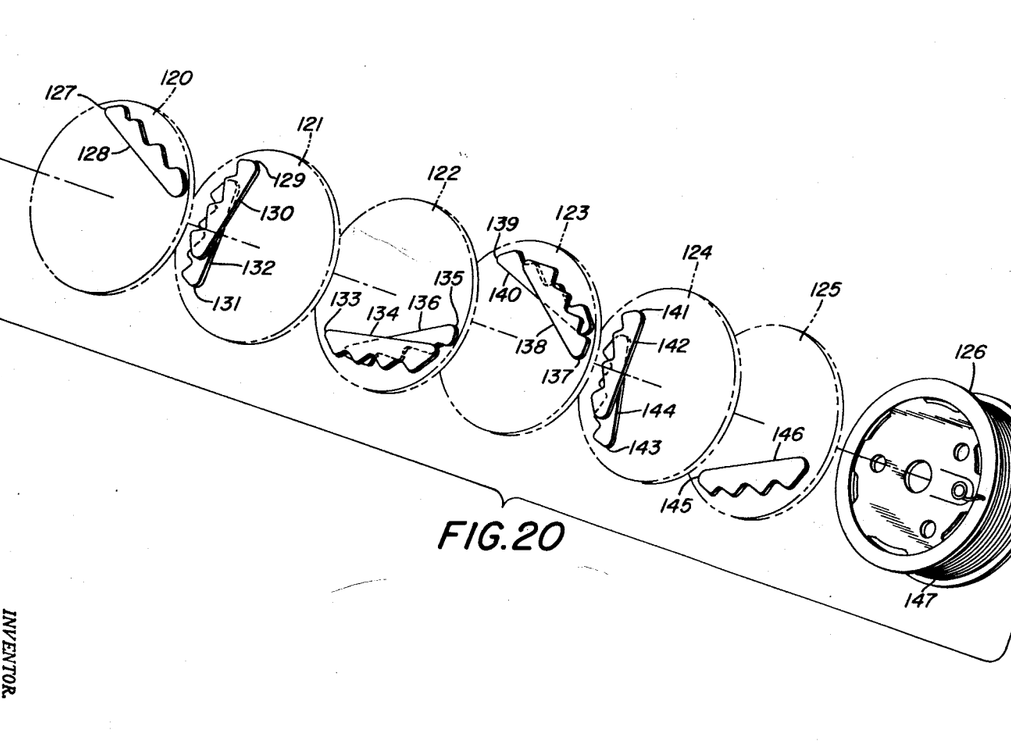
FIG. 20 is an exploded perspective view, partly in outline, illustrating the relationship of the gap electrodes and of the magnetic control coil.

The operative relationship of the several gap electrodes or gap unit and the associated magnetic control unit will be more clearly understood by reference to FIG. 20. As therein shown, a succession of gap plates, including an end plate 120, intermediate gap plates 121, 122, 123 and 124 and an end plate 125 are disposed along a common longitudinal axis with a magnetic control unit 126. The gap plates are shown in dotted outline, while the gap electrodes are shown in full outline in order to emphasize the physical relationship of the electrodes. As there shown, the gap face 127 of the gap electrode 128 forms with the arc face 129 of the gap electrode 130, a first arc gap; the gap face 131 of the gap electrode 132 and the arc face 133 of the gap electrode 134, a second arc gap; the arc face 135 of the gap electrode 136 and the arc face 137 of the gap electrode 138, a third arc gap; the arc face 139 of the gap electrode 140 and the arc face 141 of the gap electrode 142, a fourth arc gap; the arc face 143 of the gap electrode 144 and the arc face 145 of the gap electrode 146, a fifth arc gap. All the arc gaps formed with the several gap electrodes are uniformly spaced and positioned about the longitudinal axis of the assemblage so that all are substantially equally subjected to the magnetic field generated by the coil 147 of the magnetic control unit 126, and the coil of the associated control unit, if any, directed along that axis. The arcs formed between the arc faces of the several pairs of electrodes are, therefore, simultaneouly moved inwardly toward and across the longitudinal axis to uniformly lengthen the several arcs.

In the operation of the gap unit, the arc is initially formed between the arc faces of the cooperating electrodes which form a gap, although arcs are, of course, simultaneously formed in the several gaps of the gap unit. This arc is formed in the arc recess surrounding the ends of the electrodes of the adjacent plate members, e.g. the recess formed by the surface 91 shown in FIGS. 13 and 17 and the opposed cooperating surface of the adjacent plate.

Upon the initiation of the magnetic field by current flow through the magnetic coil, the arc is moved along the diverging inner faces of the electrodes, as e.g. the face 95 in FIG. 18, entering the arc extinguishing chamber formed by the opposed parallel surfaces of the plate members, e.g., the surface 94 and the associated surface corresponding to the surface 108 of the gap plate members, through the arc entrance chamber formed by the inclined surfaces 93 and the associated surface corresponding to the surface 109 of the gap plate members. The arc moves outward toward and across the longitudinal axis, maintaining the perpendicular relation between the path of the arc and the field due to the coil, and transferring energy to the walls of the arc chamber, e.g. to the gap plate member, by thermal conduction until the arc is extinguished. In FIG. 11, the arc moves outward and about the projection 102 and the projection of the associated plate abutting the surface 117 and into the region adjacent the rim 85.

Inasmuch as the outer periphery of the gap chamber is closed by the ridge of the gap plate, the confined atmosphere within the arc chamber would tend to prevent movement of the arc. However, provision of the groove 97 permits the circulation of the atmosphere in the gap chamber, through the portions 100, 99 and 98, respectively, so that the arc is permitted to move freely from the arc faces along the diverging sides of the electrodes.

In the operation of the lightning arrester, as such, an impulse produced in the line 33 by lightning discharge, for example, by direct stroke, produces a division of the lightning voltage between the line and ground in which a very great proportion of the voltage, in the order of 99%, is across the grading resistors 38 with the remaining proportion across the valve blocks. This division of voltage continues until the breakdown voltage of the gaps 36 is reached, whereupon the gaps arc over and the voltage across each grading resistor is reduced to a low order, approximately 30 volts per gap multiplied by the number of gaps in series across each grading resistor. The lightning impulse is thus discharged to ground through the valve blocks 29. During this interval, because of the steepness of the wave front, there is virtually no current through the coils 35 and conduction is through the shunt resistors 37.

At the instant the arc gaps become conducting or shortly thereafter, the system energizing voltage, which exists between the line and ground, produces a current which flows through the arc gaps and through the valve blocks 29 to ground. This current is known as the power follow current and continues after the discharge of the lightning impulse. However, the frequency of the power system voltage, and hence the effective impedance of the coils 35, is such that the current flow is substantially through those coils, thus producing a magnetic field which moves the several arcs outwardly from the arc faces along the diverging sides of the arc electrodes of the several arc gaps and into the arc extinguishing chambers associated with the arc gaps. This lengthening of the several arcs produces an increase in arc voltage, which acts effectively as a counter E.M.F., reducing the voltage across the valve blocks 29 and reducing the flow of power follow current to ground. The outward movement of the arcs proceeds rapidly, e.g. in a small fraction of a cycle of the system energizing voltage, so that the increase in arc voltage produces a rapid reduction in the magnitude of the power follow current until the arc voltage exceeds the system energizing voltage, whereupon the power follow current is reduced to zero and the arc is extinguished.

The importance of the construction of the gap unit of the invention resides in the fact that a very great increase in arc length may be produced under the influence of the magnetic field produced by the magnetic coils. Consequently, the arc voltage is increased to a magnitude such that the power follow current is reduced to zero without regard to the portion of the cycle in which the initial impulsive discharge by the lightning stroke takes place, that is, without dependence upon a reversal of the direction of the current flow for interrupting the power follow current. Since a sufficient arc voltage may be built up to equal or exceed the line voltage, it becomes evident also that a lightning arrester constructed in accordance with the teachings of the invention may be utilized on direct current lines.

It is an important aspect of the invention that the construction of the gap unit enables the use of very thin gap plate members and consequently that a very compact gap unit may be constructed for a given voltage rating. This result is achieved inasmuch as the stacked arrangement of the electrode plates causes the force produced by the pressure generated at one side of a gap plate member consequent upon the formation and movement of an arc on that side of the member to be opposed by an oppositely directed force produced by the similar pressures produced by the formation and movement of the companion arc on the other side of the member. This feature is of particular importance in connection with the arc recesses where very sharp pressure waves are generated upon the initial establishment of the arc across the adjacent ends of the gap electrodes.

Referring to FIG. 6, the gap plate 150 has an arc recess forming surface 91 opposed by the projection 116. Similarly, the plate member 151 has an arc recess forming surface 107 opposed by the projection 102. The intervening gap plate 152 has the portion thereof between the opposed surfaces, designated as 117 and 118 in FIGS. 11 and 15, interposed between and engaged with the projections 116 and 102 of the gap plates 150 and 151. The symmetric arrangement of the plate is, of course, such that the relations shown in the section view of FIG. 6 prevail in each of three directional planes, 120° apart, through the longitudinal axis of the spark of the gap unit. Thus, a solid column of the plate member insulating material exists between the arc recesses of every first and second and fourth and fifth gap plate, e.g. between the arc recesses of every first and fourth arc gap. As a result, the high pressure generated in the arc recesses counteracts each other and frees the plate member of the stresses which would otherwise be produced. If this construction were not utilized, then the plate member would be shattered by the pressures generated in the arc recess of a given gap before the pressure waves generated at the arc recesses of the next adjacent gaps would arrive opposite the arc recess of that gap to reinforce the material of the plate member.

The pressures generated in the arc extinguishing chambers are of a relatively low order and are, moreover, propagated in the chamber at a much slower speed than those in the arc recess so that the pressures of adjacent extinguishing chambers counteract each other and the very thin walls of the plate members provide ample strength while providing the desired reduction in size and cost of the gap unit.

As a result of the above features, the plate members, as, for example, the plate member 111, may be formed of an inorganic molding material such as Mycalex, and with thicknesses which would have heretofore been considered totally impracticable. The gap units of the type described will generate arcs of in the order of 20–25 inches of length per inch of gap unit height, whereas the gap units of the prior art were considered as very favorably designed if able to generate an arc of 4–5 inches of length per inch of gap unit height. Thus, a very striking reduction in the valve block requirements and in the size and cost of lightning arresters, as such, is achieved by the practice of the present invention.

The use of a right angle step construction at the outer extremity of the gap electrodes, e.g. with the surfaces 154 and 155 parallel to the arc faces 92 at which the arc is longitudinally established, and the associated electrode recesses, is such that the forces generated by the arc upon formation thereof exert purely tensile forces upon the plate member. As a result, sufficient strength is provided in the thin plate member to withstand the relatively large forces tending to drive the gap electrodes apart.

It is to be understood, of course, that while an angular spacing of 120° between successive gaps is utilized in the embodiment shown herein, the invention is by no means limited thereto. Greater or lesser angular spacings may be utilized according to design dictates, and the construction of the reinforcing portions between corresponding axially aligned arc recesses may be modified accordingly. It is understood that angular spacings of 180° would be within the meaning of the term "helically arranged" as utilized herein.

The term "gap unit" as utilized in the preceding description is intended to refer to an organization of gap plates with end plates which constitutes a functional entity. Thus, the gap unit 49 of FIG. 6 would include all the gap plates arranged between the magnetic coil units 51 and 55. The term "spark gap" as used is intended to have substantially the same meaning as the term "gap unit," although that term also includes the functional entity which would comprise only two plates of what has hereinbefore been designated as a gap unit.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. A spark gap for lightning arresters and the like comprising a plurality of axially juxtaposed plates, each comprising a member of insulating material with first and second metallic electrodes on opposite sides thereof, metallic means extending through the member for securing the electrodes to the plate member and for electrically connecting the electrodes, each of the said first and second electrodes having an arcing end thereof cooperating with an arcing end of the second or first electrode, respectively, of a next adjacent plate to form an arc gap therewith and the adjacent faces of the electrodes diverging oppositely with respect to a diametric axis transversely across the member, the arc gaps formed by the electrodes of the several plates constituting a succession of gaps outwardly from and about the longitudinal axis of the plates, each of the plate members being formed on each side thereof to constitute one surface of an arc recess about the arcing ends of the electrodes and of an arc extinguishing chamber between the diverging portions of the electrodes, and ridge and recess means on each side of the members for interengagement with the member of adjacent plates for holding the plates each with respect to the adjacent plate.

2. The invention in accordance with claim 1, each plate member having an axial extent only sufficient to provide a rigid support for the electrodes and the arc recesses and chambers are axially opposed so that pressures generated within each of the recesses and chambers is opposed by pressures generated in the recesses and chambers on the opposite sides of the plates thereof.

3. The invention in accordance with claim 1, in which interengaging ridge and recess means includes parts extending about the peripheral extremity of the plate members for enclosing the gap electrodes and arc chambers.

4. The invention in accordance with claim 3, with means comprising a groove in each side of each plate member extending exteriorly about each of the electrodes thereof from the arc extinguishing chamber to the arc recess to permit circulation of the internal atmosphere between each of the pairs of plates during movement of arcs along the electrodes.

5. The invention in accordance with claim 1, with means comprising a groove in at least one of each two adjacent plate members extending about an electrode from the arc extinguishing chamber to the arc recess to permit circulation of the internal atmosphere between the plates during movement of an arc along the electrodes.

6. The invention in accordance with claim 1 in which the said first and second electrodes of each plate have the said arcing ends at opposite ends of the electrodes and in which the opposed electrodes between adjacent plates have the faces thereof away from the arc gaps diverging at an angle of less than 180 degrees.

7. A spark gap for lightning arresters and the like comprising a plurality of axially juxtaposed plates, each comprising a member of insulating material, first and second metallic electrodes on opposite sides of each of the plate members, each extending circumferentially along the face of the member, metallic means extending through the member for securing the electrodes to the plate member and for electrically connecting the electrodes, the said first and second electrodes having an arcing end at opposite ends thereof and disposed adjacent a transverse extremity of the member for cooperating with an arcing end of the second or first electrode respectively of a next adjacent plate and opposed thereto to form an arc gap therewith and the said opposed electrodes extending divergently across the member, the arc gaps formed by the electrodes of the several plates constituting a generally helical succession of gaps outwardly from and about a longitudinal axis centrally through the plates, each pair of the plate members being formed on adjacent sides thereof with spaced surfaces to constitute an enlarged arc recess about the arc gaps of the electrodes enclosed by the plate members, an arc extinguishing chamber having closely spaced surfaces generally between the diverging portions of the electrodes and transversely across the longitudinal axis therefrom and an entrance chamber having converging side walls extending from the arc recess to the extinguishing chamber, the extinguishing chambers being generally aligned along the longitudinal axis and having axially thin walls and the pressures generated in each chamber being opposed by the pressures generated in the adjacent chambers, and ridge and recess means on each side of each of the members for holding each plate with respect to the adjacent plate.

8. The invention in accordance with claim 7, in which the plate members are formed on at least one side thereof with a groove extending substantially from the entrance chamber about an electrode and back to the arc recess for circulating the internal atmosphere between that plate and the adjacent plate upon movement of an arc along the electrodes.

9. The invention in accordance with claim 7, each plate member having an elevated portion on each side back of the arc recess on the remaining side of the member for accommodating the arc recess and reinforcing the plate member.

10. The invention in accordance with claim 9, in which the electrodes of every first and fourth plate are in axial alignment and the elevated portions of the first and third plates contact the intervening members to constitute a solid body of insulating material between the arc recesses formed by the said first and fourth plates.

11. The invention in accordance with claim 7, in which the electrodes diverge at an angle of about 80–135 degrees.

12. The invention in accordance with claim 7, in which the adjacent sides of the electrodes diverge at constant equal angles of about fifty degrees, more or less, with respect to a diametric axis between the electrodes for increasing the length of the arc at a rate such that the arc is maintained during arc movement without restriking at the adjacent ends of the electrodes.

13. The invention in accordance with claim 7, in which the plate members are provided with recesses for receiving and positioning the electrodes and the plates, and the plate members are provided with peripheral rims and recesses for closing the arc chambers and recesses and relatively positioning the plates.

14. The invention in accordance with claim 13, in which a groove is provided in each of the plate members extending from the arc extinguishing chamber, exteriorly about the electrode and back to the arc recess for circulating movement of the internal atmosphere enclosed between adjacent plate members during movement of the arcs along the electrodes.

15. A spark gap for lightning arresters and the like comprising a plurality of pairs of gap electrodes longitudinally and circumferentially spaced about a longitudinal axis, the electrodes having adjacent one end parts closely spaced outwardly of the axis to constitute an arc gap for initial formation of an arc between the electrodes and the electrodes extending divergently in the direction of and on opposite sides of the axis in a plane perpendicular to the axis for lengthening the arc by movement along the electrodes toward the axis, means electrically connecting the several pairs of arc gaps in series, and enclosure means for the several pairs of electrodes comprising a body of insulating material disposed about the electrodes and having formed therein an arc chamber for each of the pairs of electrodes, each arc chamber comprising an arc extinguishing chamber arranged generally between the electrodes and having closely spaced walls between which an arc may travel while moving along the electrodes with each arc extinguishing chamber axially opposed to the arc extinguishing chambers adjacent thereto, an arc recess disposed about the adjacent end parts of the electrodes of each pair of electrodes and having a substantially greater axial extent than the arc extinguishing chamber, and an arc entrance chamber comprising two spaced walls converging from the arc recess to the walls of the arc extinguishing chamber, at least some of the arc gaps being aligned with each other and a substantially continuous body of insulating material between the recesses of the aligned gaps for opposing the pressures generated in each of the arc recesses by the pressures generated in the remaining gaps.

16. The invention in accordance with claim 15, in which the body of insulating material comprises a multiplicity of axially thin plates having axially engaging peripheral rims and recesses for laterally positioning the plates and closing the arc chambers and in which the surfaces of the plates within the rims and recesses contact each other at least along the portions of the plates between the gaps which are in axial alignment.

17. The invention in accordance with claim 16, in which the end plates have reinforcing means on the external sides thereof for receiving the forces generated by the end arc gaps not opposed by the forces of other arc gaps.

18. The invention in accordance with claim 15 with means for each of the pairs of gap electrodes and associated arc chamber for circulating the internal atmosphere of the chamber, comprising a groove in the body extending from the arc extinguishing chamber about an electrode and back to the arc recess for relieving pressures generated by the arc in the extinguishing chamber and facilitating elongation of the arc.

19. A plate for a gap unit comprising a circular member of rigid insulating material having on a first side thereof a narrow rim about the periphery raised above the surface of the member within the rim, an arc recess adjacent one end of a diametrical axis and within the rim and an elevated portion of insulating material on the opposite side of the member for accommodating the recess and contacting an adjacent plate, a first flat metallic electrode disposed on one side of the arc recess with a first electrode recess for receiving the electrode and the inner extremity of the electrode diverging from the diametrical axis, a second similar electrode recess on the opposite side of the axis from the first electrode for receiving a cooperating electrode on an adjacent plate, an arc chamber forming surface extending in the direction of the diametric axis from the arc recess and converging at first rapidly and then continuing as a substantially plane depressed surface between the electrodes to provide an arc chamber having axially thin walls, a second similar configuration on the opposite side of the member in image relationship rotated with respect thereto with the second electrode recess of the second side of the member disposed below the electrode of the first side of the plate with a second electrode received therein, and means extending through the member and the electrodes to secure the electrodes to the member and provide an electrical connection between the said electrodes, each of the said sides of the plate being adapted to cooperate with an adjacent gap plate to form an enclosed spark gap and chamber therefor.

20. The invention in accordance with claim 19, in which the electrodes have a stepped configuration on the outer sides thereof and away from the arc recess and the electrode recesses conform thereto, all for resisting outward movement of the electrodes upon formation of an arc.

21. A spark gap for lightning arresters and the like comprising a pair of axially juxtaposed plates, each comprising a rigid member of insulating material, two metallic electrodes supported by the plates between the members thereof with the adjacent ends of the said electrodes constituting an arc gap and the electrodes diverging generally from the arc gap, the plate members being formed on the adjacent sides thereof with spaced surfaces to constitute an enlarged arc recess about the arc gap, an arc extinguishing chamber with closely spaced surfaces and generally between the diverging portions of the electrodes and an entrance chamber having converging side walls and extending from the arc recess to the extinguishing chamber, and a groove in the adjacent side in at least one of the plate members extending from the extinguishing chamber exteriorly about an electrode and back to the arc recess for circular movement of the internal atmosphere between the plates during movement of the arc along the electrodes from the arc recess into the extinguishing chamber.

22. A spark gap for lightning arresters and the like comprising a pair of axially juxtaposed plates, each comprising a rigid member of insulating material, two metallic electrodes supported by the plate members between the members, the two electrodes having the end parts thereof in closely spaced relation adjacent one edge of the plates to constitute an arc gap and extending in opposite directions through substantial arcs about a longitudinal axis centrally through the plates and with the adjacent faces of the electrodes diverging toward the axis on opposite sides thereof, the plate members being formed on the adjacent sides thereof with spaced surfaces to constitute an enlarged arc recess about the arc gap, an arc extinguishing chamber with closely spaced surfaces generally between the diverging portions of the electrodes and an entrance chamber having converging side walls between the electrodes and extending from the arc recess to the extinguishing chamber, and groove means in the adjacent side in at least one of the plate members extending generally from the extinguishing chamber exteriorly about an electrode and back to the arc recess for circular movement of the internal atmosphere between the plates during movement of the arc along the electrodes from the arc recess into the extinguishing chamber.

23. An electric circuit interrupter comprising a plurality of pairs of abutting plates of rigid insulating material, a pair of spaced electrodes mounted between each said pair of plates having adjacent ends thereof defining an arc gap and the successive pairs of electrodes being successively positioned along and about a longitudinal axis of the abutting members to arrange the arc gaps along a generally helical arcing path about the axis, and the adjacent arcing faces of the electrodes of each pair being disposed in a plane perpendicular to the axis and diverging apart inwardly along a transverse direction through the axis, the adjacent walls of the pairs of plates being spaced to form an arc chamber about the arc gap and between and outwardly from the diverging portions of the electrodes, the said plates being in contacting relation around the periphery thereof to close the said chamber, circulating means extending from the arc chamber about one of the electrodes and back to the arc chamber to permit circulation of the internal atmosphere between the plates during elongation of the arc along the electrodes, a coil mounted adjacent to the said members and parallel to the electrodes and centered on the axis for producing a magnetic field along and symmetrically about the axis, and a series electrical connection between the pairs of electrodes and the coil, all for producing a simultaneous elongation of arcs initially formed in the arc gaps by movement thereof along the arcing faces and inwardly of the said helical path to increase the total arc voltage of the interrupter.

24. A spark gap for lightning arresters and the like comprising a pair of axially juxtaposed plates, each comprising a rigid member of insulating material, two spaced metallic electrodes supported by the plates with the adjacent parts of the said electrodes constituting a gap for an arc therebetween, the plate members being formed on the adjacent sides thereof with spaced surfaces to constitute an arc recess about the gap and an arc extinguishing chamber generally between the electrodes communicating with the arc recess, and a groove in a side of at least one of the plate members adjacent the remaining one of the members extending from the extinguishing chamber exteriorly about an electrode and back to the arc recess for circulating movement of the internal atmosphere between the plates during movement of the arc between the plates.

25. A spark gap for lightning arresters and the like comprising a plurality of axially juxtaposed plates, each comprising a member of insulating material, first and second metallic electrodes on opposite sides of each of the plate members, each extending circumferentially along a face of the member adjacent a transverse extremity thereof, means securing the electrodes to the plate member and means electrically connecting the electrodes in series, the said first and second electrodes having arcing ends at circumferentially opposite ends thereof for cooperating with an adjacent electrode opposed thereto to form an arc gap, the arc gaps formed by the electrodes of the several plates constituting a generally helical succession of gaps outwardly from and about a longitudinal axis centrally through the plates, the said opposed electrodes having adjacent faces thereof diverging oppositely in the transverse direction across the member for elongating movement of an arc formed across the arc gap along the electrodes and transversely across the member, each pair of plate members being formed on adjacent sides thereof with spaced surfaces to constitute an arc chamber about the electrodes and the arc chambers being generally aligned along the longitudinal axis whereby pressure generated in each chamber is opposed by the pressure in the adjacent chamber, and means for holding each plate with respect to the adjacent plate.

26. The invention in accordance with claim 25 in which the circumferential extent of the electrodes is such that the electrodes are intermittently in aligned relation in the longitudinal direction of the plates and the plates having aligned electrodes are reinforced by the intervening plate members.

27. The invention in accordance with claim 26 in which the electrodes are received in recesses in the plate members and the plate members have peripheral rims and recesses for enclosing the electrodes.

28. A spark gap comprising a pair of axially juxtaposed plate members of rigid insulating material, electrode means carried between the plates comprising spaced metallic electrode pieces having arcing faces along adjacent portions thereof including an arc gap for arc initiation and divergently spaced faces for elongating movement of the arc away from the arc gap, an arc chamber constituted by spaced surfaces on adjacent sides of the plate members between the electrode pieces and extending generally about the arcing faces of the electrode pieces and outwardly from the divergently spaced faces, and means for conducting the internal atmosphere of the arc chamber away from that portion of the arc chamber generally between the divergently spaced faces of the electrode pieces and remote from the arc gap to that portion of the arc chamber about the arc gap to facilitate elongating movement of an arc along the divergently spaced faces of the electrode pieces.

29. The invention in accordance with claim 28 in which the said conducting means comprises means on one of the plates defining an open channel and means on the remaining one of the said plate members closing the said channel to separate the interior of the channel from the arc chamber.

30. The invention in accordance with claim 28 in which the said conducting means comprises a groove in one of the plate members extending exteriorly about one of the electrode pieces.

31. The invention in accordance with claim 30 in which an electrode piece is carried by one of the plate members and the groove is formed in the remaining one of the plate members.

32. A lightning arrester comprising an elongate ceramic housing having an axial opening, closure means for the said housing at each end thereof with metallic means constituting terminals for the arrester, and a stack of superimposed arrester elements including a valve block, a gap unit and a magnetic control unit in the opening and in series connection with the metallic means, the said gap unit comprising a plurality of plates in superimposed relationship, each plate comprising an axially thin piece of rigid insulating material having the surfaces thereof configured to form arc chambers with adjacent plates, a plurality of pairs of electrodes, each pair constituted by two electrodes arranged between two adjacent plate members and each electrode having an arcing face thereof disposed within an arc chamber, the pairs of electrodes being connected in series and being successively rotated about a longitudinal axis centrally through the plates in planes perpendicular to the axis and each pair of electrodes extending divergently across the plates on opposite sides of the said axis for simultaneous formation of arcs at the ends thereof adjacent the transverse extremities of the plates and elongation of the arcs by movement thereof inwardly and across the plates within the arc chambers, the said arc chamber surfaces being spaced apart in the direction of the said axis whereby the pressures in each chamber are opposed by the pressures in adjacent chambers, and the magnetic control unit comprising a coil disposed in a plane perpendicular to the axis of the gap unit to provide a symmetric field for simultaneous movement of the several arcs, all for increased interrupting capacity and height saving in the arrester.

33. A lightning arrester comprising an elongate ceramic housing having an axial opening, closure means for the said housing at each end thereof with metallic means constituting terminals for the arrester, and a stack of superimposed arrester elements including a valve block, a gap unit and a magnetic control unit in the opening and in series connection with the metallic means, the said gap unit comprising a plurality of plates in superimposed relation, each plate comprising a piece of rigid insulating material having the surfaces thereof configured to form arc chambers with adjacent plates, a plurality of pairs of electrodes, each pair constituted by two electrodes arranged between two adjacent plate members and each electrode having an arcing face thereof disposed within an arc chamber, one electrode of each pair being carried on one plate and the remaining electrode of said pair being carried on the adjacent plate with the electrodes on each p'ate supported in longitudinal alignment and series interconnection by metallic means extending through the plate, the arcing faces of the electrodes on each plate being oppositely directed in the circumferential direction so that successive pairs of electrodes are successively rotated about a longitudinal axis centrally through the plates in planes perpendicular to the axis, and each pair of electrodes extending divergently across the plates on opposite sides of the said axis for simultaneous formation of arcs at the ends thereof adjacent the transverse extremities of the plates and elongation of the arcs by movement thereof inwardly and across the plates within the arc chambers, and the magnetic control unit comprising a coil disposed in a plane perpendicular to the axis of the gap unit to provide a symmetric field for simultaneous movement of the several arcs, all for increased interrupting capacity and height saving in the arrester.

34. The invention in accordance with claim 33, including a plurality of gap units and magnetic control units in series disposition and a non-linear grading resistor connected in shunt with each gap unit and its series connected control unit, all for initially establishing a voltage impulse across the gap unit.

References Cited in the file of this patent

UNITED STATES PATENTS

| | | |
|---|---|---|
| 444,678 | Thomson | Jan. 13, 1891 |
| 2,554,278 | Teszner | May 22, 1951 |
| 2,566,895 | Kalb | Sept. 4, 1951 |
| 2,608,599 | Kalb | Aug. 26, 1952 |
| 2,644,116 | Olsen | June 30, 1953 |
| 2,805,355 | Snell | Sept. 3, 1957 |